United States Patent [19]

Ilaria

[11] 4,282,123

[45] Aug. 4, 1981

[54] ELASTOMERIC URETHANE COATING

[75] Inventor: Joseph E. Ilaria, Cranford, N.J.

[73] Assignee: Mobil Oil Corporation, New York, N.Y.

[21] Appl. No.: 124,016

[22] Filed: Feb. 25, 1980

Related U.S. Application Data

[63] Continuation-in-part of Ser. No. 64,293, Aug. 6, 1979, abandoned.

[51] Int. Cl.$^3$ .............................................. C08G 18/58
[52] U.S. Cl. ........................... 260/18 PT; 260/18 TN; 428/425.8; 528/59; 528/73
[58] Field of Search ...................... 260/18 PT, 18 TN; 528/59, 73

[56] References Cited

U.S. PATENT DOCUMENTS

| | | | |
|---|---|---|---|
| 3,489,723 | 1/1970 | Kraft ....................................... | 528/59 |
| 3,629,167 | 12/1971 | Allen et al. ....................... | 260/18 PT |
| 3,699,061 | 10/1972 | Cunningham .................... | 260/18 PT |
| 4,025,579 | 5/1977 | Gruber et al. ......................... | 528/59 |
| 4,064,194 | 12/1977 | Evans et al. ........................... | 528/59 |
| 4,160,065 | 7/1979 | Loewrickeit et al. ................. | 528/59 |

FOREIGN PATENT DOCUMENTS 1409536 10/1975 United Kingdom ...................... 528/59

*Primary Examiner*—Ronald W. Griffin
*Attorney, Agent, or Firm*—Charles A. Huggett; Michael G. Gilman; Hastings S. Trigg

[57] ABSTRACT

A two-component coating system comprises (A) a polyfunctional acid (dimer acid), low base strength amine (aniline), and high base strength amine (cyclohexylamine) adduct of a diglycidyl ether of bisphenol and (B) an organic diol reacted with 2 moles of a diisocyanate. The coating is particularly adapted for coating surfaces subject to high abrasion, e.g., railroad hopper cars.

4 Claims, No Drawings

ELASTOMERIC URETHANE COATING

CROSS-REFERENCE TO RELATED APPLICATIONS

This application is a continuation-in-part of copending application Ser. No. 64,293, filed Aug. 6, 1979 now abandoned.

BACKGROUND OF THE INVENTION

1. Field of the Invention

This invention is concerned with an elastomeric urethane coating two-component system that is particularly adapted for coating surfaces subject to abrasion, such as railroad hopper cars, mining equipment, solids hoppers, conveyors and the like.

2. Description of the Prior Art

Insofar as is now known a spray applied coating of this invention has not been proposed. In U.S. Pat. No. 3,629,167, there is disclosed a similar resin composition. However, there is no teaching of the isocyanate terminated long chain flexible component (B, infra).

SUMMARY OF THE INVENTION

This invention provides a two-component coating composition wherein:

(1) Component A comprises an adduct of a diglycidyl ether of bisphenol A, having an epoxy equivalent weight between about 170 and about 2,000, polyfunctional acid, and a mixture of high base strength and low base strength amine, pigment, magnesium silicate talc extender, and a solvent mixture of alkoxyethyl acetate, alkyl ketone, ethyl acetate, and aromatic hydrocarbon with a solids content of 60–70 weight percent; and (2) Component B comprises a urethane prepolymer based on flexible polyhydroxy functional oligomers and toluene diisocyanate or isophorone diisocyanate;

(3) the volume ratio of Component A: Component B being between about 1:3 and 3:1.

DESCRIPTION OF SPECIFIC EMBODIMENTS

The coating composition of this invention is composed of two components which are mixed just prior to application. After mixing the components, the composition has a pot life of about 2 hours. In practice, the mixed components are feasibly applied with an airless pump to a clean (preferably prime-coated) metal surface at a film thickness in the order of 33 mils wet and 21 mils dry. The coating is particularly useful for coating the surfaces which are subjected to severe abrasion conditions by the cargo carried (coal, gravel, sand, dolomite, etc.) as well as to corrosives, such as those generated by wet coal, phosphate rock, and the like.

COMPONENT A

This component contains a modified epoxy resin, pigments, a magnesium silicate talc extender, and suitable solvents.

The epoxy resins are the diglycidyl ethers of bisphenols, a class of compounds which are constituted by a pair of phenolic groups interlinked through an intervening aliphatic bridge. While any of the bisphenols may be used, the compound 2,2-bis (p-hydroxyphenyl) propane, commonly known as bisphenol A, is more widely available in commerce and is preferred.

The epoxy resins will have an epoxy equivalent weight of between about 170 and about 2,000 and an epoxy value between about 0.60 and about 0.05. The preferred epoxy resins, i.e., those made from bisphenol A, will have two epoxy groups per molecule.

The polyfunctional acid reacted with the epoxy resin includes aliphatic dicarboxylic acids having the structure $HOOC(CH_2)_nCOOH$, wherein n is 2–8. The aliphatic dicarboxylic acids include adipic acid, pimelic acid, suberic acid, azelaic acid, and sebacic acid.

It is also within the contemplation of this invention to use dimerized unsaturated fatty acids up to and including 36 carbon atom dimer acids and diacids resulting from the Diels-Alder reaction of acrylic acid or methacrylic acid with conjugated unsaturated fatty acids having up to 18 carbon atoms, e.g.,

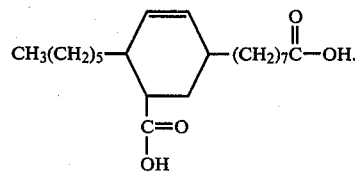

Also contemplated as polyfunctional acid are acid terminated polyesters containing at least about 40% of components derived from $C_4$–$C_9$ alkanedioic acids and carboxylic acid terminal polybutadiene and copolymers of butadiene with acrylonitrile.

The high base strength amines are the aliphatic amines. Suitable aliphatic amines include the aliphatic and cycloaliphatic, primary, secondary and tertiary amines, preferably containing up to 15 carbon atoms, such as methylamine, ethylamine, propylamine, isopropylamine, butylamine, isobutylamine, sec-butylamine, tert-butylamine, amylamine, isoamylamine, sec-amylamine, tert-amylamine, hexylamine, heptylamine, diisopropylamine, dibutylamine, diisobutylamine, trimethylamine, triethylamine, tripropylamine, tributylamine, triisobutylamine, cyclohexylamine, and cycloheptylamine.

The low base strength amines are the aromatic amines. Suitable aromatic amines include the primary, secondary and tertiary amines such as aniline, ortho-, meta-, and paratoluidine, the xylidines, the phenylenediamines, N-methylaniline, N-ethylaniline, dimethylaniline, triphenylamine, alpha-naphthylamine, beta-naphthylamine, pyridine and substituted pyridines and benzylamine.

The epoxy resin is reacted with the polyfunctional acid, the high base strength amine, and the low base strength amine in an amount to react with 0.5 to all the epoxy groups. The amount of polyfunctional acid reacted is 0.1–0.6 equivalent per 1.0 equivalent of epoxy resin. The amount each of the high base strength amine and of the low base strength amine reacted is 0.1–0.6 equivalent per 1.0 equivalent of epoxy resin. The weight ratio of the high base strength to the low base strength amine can be between about 2:1 and about 1:2 depending upon the desired rate of cure for the intended application.

Although a catalyst is not essential, it may be desired to use a suitable catalyst in the reaction between the epoxy resin and the polyfunctional acid. Suitable catalysts are tertiary amines, tertiary phosphines, and quaternary ammonium and phosphonium compounds.

The polyfunctional acid, the low base strength amine, and the high base strength amine are readily adducted to the epoxy resin, usually in sequence, at temperatures in the order of about 163° C. (325° F.) in about 2-3 hours.

EXAMPLE 1

A modified epoxy resin was prepared using the following recipe:

| Formulations | |
|---|---|
| EPON 829* | 39.66% by wt. |
| Dimer acid | 11.19% by wt. |
| Aniline | 3.33% by wt. |
| Cyclohexylamine | 2.21% by wt. |
| Cellosolve acetate | 26.20% by wt. |
| Ethylbenzene | 17.41% by wt. |
| | 100.00% by wt. |

*Epoxy equivalent weight about 193-203

COOKING PROCEDURE

1. Charge Epon 829 and dimer acid (Empol 1016) to a kettle equipped with agitation and inert gas.
2. Raise temperature to about 163° C. (325° F.) and hold for 45 minutes.
3. Cut heat and begin addition of the aniline at a steady rate over a 15 minute period. After addition of the aniline, add the cyclohexylamine, also over a 15 minute period.
4. Hold the reaction mixture for 90 minutes at 163° C. (325° F.) after complete addition of the cyclohexylamine.
5. Reduce to 55% solids with cellosolve acetate and ethylbenzene 60/40 wt.%. Maintain the temperature above 121° C. (250° F.) during the addition of the solvents.

The modified DGEBA is then mixed with pigment, magnesium silicate talc extender, and solvent (MEK, about 7-10 weight percent on solids) and ground to NS4. The mixture is then let down in a mixture of ketone (MEK), toluene, and ethyl acetate containing a catalytic amount of dibutyl tin dilaurate.

The pigment in the following example is carbon black, but any well known filler pigment can be used, such as titanium dioxide, zinc oxide, bentonite, silica, ochers, and chrome yellows and greens. The amount of pigment can vary, but generally is in the order of about 3-10 weight percent based on solids.

The magnesium silicate talc extender can be used in amounts of about 60-80 weight percent based on solids. The balance of the solids will be the aforedescribed modified DGEBA, about 15-25 weight percent based on solids.

The solvent system in Component A contains $C_1$-$C_4$ alkoxyethyl acetate, such as ethoxyethyl acetate; alkyl ketone, such as methylethyl ketone (MEK); ethyl acetate; and aromatic hydrocarbons, such as toluene, ethylbenzene, and xylene. The amount of solvent used, based upon total weight of solvents will be about 15-20 percent alkoxyethyl acetate, about 60-65 percent alkyl ketone, about 5-10 percent ethyl acetate, and about 10-15 percent aromatic hydrocarbons. The amount of solvent used will be sufficient to adjust the solids content of Component A to about 60-70 weight percent.

EXAMPLE 2

The following ingredients were added in the order shown and mixed at a high speed:
243.7 parts of the product of Example 1,
30.6 parts lampblack pigment,
435.5 parts magnesium silicate talc extender,
62.8 parts MEK,
16.7 parts surfactant,
25.5 parts Thixatrol viscosity control agent.

After mixing, the materials were ground to NS4, taking care that the temperature did not exceed 57° C. (135° F.). If necessary, the material was cooled with letdown solvent.

The material after grinding was letdown with the polymer letdown solvent mixture:
203.1 parts MEK,
10 parts toluene,
31.4 parts ethyl acetate and
10.4 parts dibutyl tin dilaurate (5% in MEK).

The final composition, which is Component A, had 60% solids. In this Example, all parts are by weight.

COMPONENT B

Component B comprises a long dihydroxy oligomer having isocyanate end groups.

These are adducts containing flexible segments and are prepared by selectively reacting one of the two isocyanate groups of toluene diisocyanate or isophorone diisocyanate with the terminal hydroxyl groups of flexible polyfunctional oligomers such as those described below:

Hydroxy terminated polyalkylene oxides formed by polymerization of ethylene, propylene or butylene oxides. These materials may also be copolymerized with minor amounts of trimethylolethane, trimethylol propane, glycerol or pentaerythritol to form lightly branched structures.

Hydroxy terminated polyesters containing at least 40 percent of components which are $C_4$ to $C_9$ alkanediols and alkanedioic acids.

Hydroxy terminated polybutadienes.

This selective reacting is carried out using two moles of the diisocyanate and one mole of the flexible polyfunctional oligomer.

The final coating, which is mixed at the time of prior application, comprises Component A and Component B mixed in a volume ratio of 1:3 to 3:1, preferably about 3:2. This composition (ratio 3:2) contains about 71.7 percent by weight solids and has a viscosity of 85±5 KU.

When applied to a clean steel surface at a 21 mils dry film thickness, the coating was tack free after drying overnight. It has a gloss of 40 percent and had the following physical properties:
Tensile Strength—800-1200 psi
Elongation—150-300%
Abrasion Resistance—Higher than can be measured with conventional paint testing equipment.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:
1. A two-component coating composition wherein:
(1) Component A comprises an adduct of a diglycidyl ether of bisphenol A, having an epoxy equivalent weight between about 170 and about 2,000, polyfunctional acid, and a mixture of aliphatic and aromatic amine, pigment, magnesium silicate talc extender, and a solvent mixture of alkoxyethyl ace- tate, alkyl ketone, ethyl acetate, and aromatic hydrocarbon with a solids content of 60–70 weight percent; and (2) Component B comprises a urethane prepolymer based on flexible polyhydroxy functional oligomers and toluene diisocyanate or isophorone diisocyanate;

(3) said Component A and Component B being mixed at the time of application.

2. The composition of claim 1, wherein said Component A and said Component B are admixed for application in a volume ratio of between about 1:3 and about 3:1.

3. The composition of claims 1 or 2, wherein, in said Component A, said diglycidyl ether has an epoxy equivalent weight between about 185 and about 210, said polyfunctional acid is dimer acid, said aliphatic amine is cyclohexylamine, and said aromatic amine is aniline.

4. The composition of claim 3, wherein said Component B is a urethane prepolymer based on hydroxy terminated polyalkylene oxides selectively reacted with one of the two isocyanate groups of toluene diisocyanate.

* * * * *